(12) United States Patent
Morris

(10) Patent No.: US 11,536,035 B2
(45) Date of Patent: Dec. 27, 2022

(54) FILM APPLICATION METHOD AND CONSTRUCTION PANEL

(71) Applicant: TRADE FABRICATION SYSTEMS LTD., Warrington (GB)

(72) Inventor: Howard M. Morris, West Lancashire (GB)

(73) Assignee: Trade Fabrication Systems Ltd., Woolston (GB)

( * ) Notice: Subject to any disclaimer, the term of this patent is extended or adjusted under 35 U.S.C. 154(b) by 88 days.

(21) Appl. No.: 17/138,218

(22) Filed: Dec. 30, 2020

(65) Prior Publication Data
US 2021/0115678 A1 Apr. 22, 2021

Related U.S. Application Data

(63) Continuation of application No. 15/866,092, filed on Jan. 9, 2018, now abandoned.

(30) Foreign Application Priority Data

Jan. 9, 2017 (GB) ...................................... 1700341

(51) Int. Cl.
*E04F 15/024* (2006.01)
*E04C 2/24* (2006.01)
(Continued)

(52) U.S. Cl.
CPC .......... *E04F 15/02405* (2013.01); *B05D 1/12* (2013.01); *B05D 5/10* (2013.01);
(Continued)

(58) Field of Classification Search
CPC .......... E04F 15/02405; E04F 15/02155; E04F 2201/07; E04F 2203/065; B05D 1/12;
(Continued)

(56) References Cited

U.S. PATENT DOCUMENTS 3,265,547 A 8/1966 Selbe
4,297,187 A 10/1981 Deguchi
(Continued)

FOREIGN PATENT DOCUMENTS

CA 2216027 3/1998
CN 1678705 A 10/2005
(Continued)

OTHER PUBLICATIONS

Chinese Patent Office First Office Action for Application No. 201880016755.7 dated Dec. 3, 2020 (8 pages including English summary).

(Continued)

*Primary Examiner* — Michael N Orlando
*Assistant Examiner* — Christopher W Raimund
(74) *Attorney, Agent, or Firm* — Michael Best & Friedrich LLP

(57) ABSTRACT

A method of applying a protective film to a construction panel comprising: (a) selectively applying an adhesive composition to a peripheral region of a surface of the construction panel; and/or selectively applying an adhesive composition to a peripheral region of a surface of the protective film; and (b) applying a protective film to the surface of the construction panel to bond the protective film to the construction panel. A construction panel comprising a protective film layer on a surface of the panel and a peripheral adhesive composition layer located between said surface of the panel and the protective film layer, wherein the peripheral adhesive composition layer extends from an edge of the panel and across from about 0.1% to about 25% of the width of the surface.

17 Claims, 4 Drawing Sheets

(51) Int. Cl.
| | |
|---|---|
| *B32B 13/00* | (2006.01) |
| *B32B 27/00* | (2006.01) |
| *E04C 2/16* | (2006.01) |
| *B32B 21/08* | (2006.01) |
| *B32B 27/36* | (2006.01) |
| *B32B 27/32* | (2006.01) |
| *B32B 3/06* | (2006.01) |
| *B32B 27/30* | (2006.01) |
| *B32B 3/02* | (2006.01) |
| *B32B 27/16* | (2006.01) |
| *B32B 21/02* | (2006.01) |
| *B05D 1/12* | (2006.01) |
| *B05D 5/10* | (2006.01) |
| *B32B 7/12* | (2006.01) |
| *E04F 15/02* | (2006.01) |

(52) U.S. Cl.
CPC ............. *B32B 3/02* (2013.01); *B32B 3/06* (2013.01); *B32B 7/12* (2013.01); *B32B 13/00* (2013.01); *B32B 21/02* (2013.01); *B32B 21/08* (2013.01); *B32B 27/00* (2013.01); *B32B 27/16* (2013.01); *B32B 27/304* (2013.01); *B32B 27/306* (2013.01); *B32B 27/32* (2013.01); *B32B 27/36* (2013.01); *E04C 2/16* (2013.01); *E04C 2/246* (2013.01); *E04F 15/02155* (2013.01); *B32B 2270/00* (2013.01); *B32B 2307/71* (2013.01); *B32B 2307/732* (2013.01); *B32B 2419/06* (2013.01); *B32B 2607/00* (2013.01); *E04F 2201/07* (2013.01); *E04F 2203/065* (2013.01)

(58) Field of Classification Search
CPC .... B05D 5/10; B32B 3/02; B32B 3/06; B32B 7/12; B32B 13/00; B32B 21/02; B32B 21/08; B32B 27/00; B32B 27/16; B32B 27/304; B32B 27/306; B32B 27/32; B32B 27/36; B32B 2270/00; B32B 2307/71; B32B 2307/732; B32B 2419/06; B32B 2607/00; E04C 2/16; E04C 2/246; E04C 2/30; E04G 21/30
See application file for complete search history.

(56) References Cited

U.S. PATENT DOCUMENTS

| | | | |
|---|---|---|---|
| 5,942,062 A | 8/1999 | Hassall | |
| 2006/0059852 A1 | 3/2006 | Toas | |
| 2007/0015424 A1 | 1/2007 | Toas | |
| 2007/0130867 A1* | 6/2007 | Flaherty | ............... B32B 27/10 428/107 |
| 2013/0318911 A1* | 12/2013 | Sealock | ............... E04B 1/762 428/71 |

FOREIGN PATENT DOCUMENTS

| | | | |
|---|---|---|---|
| EP | 0135663 | 4/1985 | |
| EP | 1330353 B1 * | 1/2006 | ............ B32B 27/00 |
| FR | 2618725 | 2/1989 | |
| FR | 2671806 | 7/1992 | |
| FR | 2884756 A1 | 10/2006 | |
| JP | S5542523 | 3/1980 | |
| JP | H11293843 | 10/1999 | |
| JP | 2006143867 A | 6/2006 | |
| JP | 2007291838 | 11/2007 | |
| WO | 02/34508 | 5/2002 | |
| WO | 2006/034381 A2 | 3/2006 | |
| WO | 2008082846 | 7/2008 | |

OTHER PUBLICATIONS

Search Report from the Great Britain Intellectual Property Office for Application No. 1700341.9 dated Jul. 13, 2017 (5 pages).
PCT/GB2018/050015 International Search Report and Written Opinion of the International Searching Authority dated May 8, 2018 (11 pages).
Adams et al., "An Introduction to Wide Web Laminations and Coatings", 2004 TAPPI PLACE Division Conference, Aug. 29-Sep. 2, 2004. (Year: 2004).
Shields, "Adhesives Handbook" 3rd ed. Reprinted with revisions (1985). (Year: 1985).
Grip Rite Specialty Building Wraps Brochure (2015) (Year: 2015).
LP Building Products, OSB Sheathing Specifications, Sep. 15, 2007, https://lpcorp.com/resources/product-literature/specifications/1p-longlength-osb-sheathing-specifications-engl ish. (Year: 2007).
United Kingdom Intellectual Property Office Examination Report for Application No. GB1700341.9 dated Apr. 30, 2021 (1 page).

* cited by examiner

FILM APPLICATION METHOD AND CONSTRUCTION PANEL

CROSS REFERENCE TO RELATED APPLICATIONS

This application is a continuation of U.S. patent application Ser. No. 15/866,092, filed on Jan. 9, 2018, which claims priority to Great Britain Patent Application No. 1700341.9, filed on Jan. 9, 2017, the contents of each which are incorporated by reference herein in its entirety.

FIELD OF THE INVENTION

The present invention relates to construction panels and methods of manufacturing the same. The methods include selectively applying a protective film to a construction panel comprising selectively applying an adhesive composition to a peripheral region of a surface of the construction panel and/or selectively applying an adhesive composition to a peripheral region of a surface of the protective film and applying the protective film to the surface of the construction panel to bond the protective film to the construction panel.

BACKGROUND

Construction panels are commonly used to construct flooring and roofing in new buildings. During construction of the new buildings, the flooring is often installed early on in the building process to enable construction workers to walk around the construction site safely. This means that the construction panels are installed, as flooring, before the windows and walls of the building are installed. Similarly, the roofing of new buildings may be installed during the early stages of a construction project to provide coverage of the construction site. In both situations, damage can be caused to the construction panels due to the ingress of rain, wind and general exposure to the surrounding environment. In addition, prior to installing the floor or roof, the construction panels may be stored in the open for a prolonged period during which time they may suffer from weathering damage.

To overcome these issues, it is possible to apply a protective film or layer to a surface (e.g., top/bottom surface) of the construction panels to protect the panels from damage, at least, whilst the construction of the building is ongoing. The application and reliable securing of protective films to a construction panel surface comes with its own problems. Since construction panels are not necessarily flat or planar, the protective films can suffer from lifting (e.g., peeling away) at the edges of the construction panels' surface. The lifting or peeling away of the protective film along the edges of a construction panel surface may occur for variety reasons. For example, adhesives used to seal joints (e.g., tongue and groves joints) located between construction panels can expand and spread out of the joints towards the top/bottom surfaces of the construction panel. The expanding or overflowing adhesives then force the protective film up and away from the edge of the panel's surface. The resulting raised protective film can lead to trip hazards when the construction panels are installed as flooring. Water ingress into the now exposed surface underneath the raised protective film of the construction panel can then cause damage also. This can have major cost implications for the builders and the construction industry as a whole.

It is an object of the present invention to obviate or mitigate these problems with prior art construction panels.

The present invention seeks to mitigate the above problems by providing construction panels and a method of manufacturing such panels wherein an adhesive composition is selectively applied to a peripheral edge of the construction panels and/or selectively applied to a peripheral region of the protective film

SUMMARY

In one aspect of the present invention there is provided a method of applying a protective film to a construction panel comprising (a) selectively applying an adhesive composition to a peripheral region of a surface of the construction panel and/or selectively applying an adhesive composition to a peripheral region of a surface of the protective film; and (b) applying the protective film to the surface of the construction panel to bond the protective film to the construction panel.

For the purposes of the clarity of the remaining description, the invention may, in parts, be described with reference to construction panels. Such construction panels include, but are not limited to, any panel that is suitable for use in the construction of a building, typically rectangular in shape and manufactured from any suitable material. For example, a construction panel may be a wooden panel. As illustrated in FIGS. 3 and 4, where the construction panel is rectangular in shape, there is a long edge (25), a short edge (26), a top surface (27), a width defined by a measurement extending orthogonally from one long edge (25) across the top surface (27) to the other long edge and a length defined by a measurement extending orthogonally from one short edge (26) across the top surface (27) to the other short edge. Where the construction panel is a square, the edges of the panel will be equal in length and its width is defined by a measurement extending orthogonally across a top surface between opposing edges. In some embodiments, the construction panels may be planar or curved. Typically, the construction panels may have a panel width of from about 300 mm to about 1400 mm, panel length of from about 1000 mm to about 5000 mm and a panel height/thickness of from about 3 mm to about 100 mm. More preferably, the construction panels may have a panel width of about 600 mm, panel length of from about 2400 mm and a panel height/thickness of about 22 mm.

In embodiments, the construction panels may include a suitable installation system which allows separate construction panels to be connected to one another in order to form a larger surface, such as a floor, ceiling, or roof. For example, the construction panels may include tongue and groove profiled edges to allow for the connecting of separate panels together.

It will be appreciated that the construction panels may be formed of any suitable material. Examples of suitable wood-based materials include, but are not limited to, plywood, oriented strand board (OSB), medium density fibreboard (MDF), timber-board, chipboard, hardboard or any combination thereof.

As used herein, the term "surface" may refer to a top surface and/or bottom surface of a construction panel but may not include the outward facing edges of the construction panel. By way of example, a top surface of a construction panel is denoted by reference numeral 27 in FIGS. 3 and 4. When used with reference to a protective film, the term "surface" may also refer to a surface of a protective film which is to be bonded to the top surface or bottom surface of a construction panel as defined herein. An illustrative example can be seen in FIG. 5, wherein a surface of a protective film is denoted by reference numeral 29.

As used herein, the term "selectively applying" refers to a focused application of an adhesive composition to a specific area on a surface of a construction panel or protective film. This may involve precisely controlling the application of the adhesive composition onto the specific area on the surface of the construction panel or protective film. As will be described in detail below, this may be achieved using a variety of application techniques including, but not limited to, brushing/trowelling, spraying, bead-jetting, nozzle dispensing, roller coating, curtain coating, solid application or any combination thereof.

As used herein, the term "peripheral region" may refer to an area of a surface of a construction panel which is, generally, located towards an outermost portion of the surface of the construction panel. It will also be appreciated that, where used with reference to a protective film, the term "peripheral region" may refer to an area of a surface of a protective film which is, generally, located towards an outermost portion of the surface of the protective film. In embodiments, the peripheral region should be sufficiently large enough that when an adhesive composition is applied to the peripheral region and the surface of the construction panel is bonded to a protective film, the problem of lifting (e.g., peeling away) of the protective film at the edges of the construction panel's surface (as mentioned above) is overcome.

It will also be appreciated that the peripheral region may extend from an edge of the construction panel and extend partially across the surface of the construction panel. Alternatively, the peripheral region may be inset from an edge of the construction panel and extend partially across the surface of the construction panel. In some embodiments, the peripheral region may be inset from an edge of the construction panel by a distance of from about 0.05% to about 5% of the width of the surface of the construction panel. More preferably, the peripheral region may be inset from an edge of the construction panel by a distance of from about 0.5% to about 2.5% of the width of the surface of the construction panel.

In some embodiments, the peripheral region may extend along the entire perimeter of the surface of the construction panel or the protective film. In other embodiments, the peripheral region may extend along only part of the perimeter of the construction panel's surface or along only part of the perimeter of the protective film. By way of example, FIGS. 3 and 4 illustrate an embodiment wherein the peripheral region (28) runs along the length (defined by the distance between edges (26)) of the construction panel's top surface (27) and parallel to the long edges (25) of the construction panel and also extends across the width (defined by the distance between edges (25)) of the top surface (27). FIG. 5 illustrates an embodiment wherein the peripheral region (30) runs along the length (defined by the distance between edges (31)) of a surface of a protective film.

In further embodiments, the peripheral region of a construction panel's surface extends from an edge of the construction panel and across the surface of the construction panel. This is shown in FIGS. 3 and 4 wherein by peripheral region (28) extends from edge (25) of a rectangular panel and across the width of the top surface (27) of the panel. In other embodiments, the peripheral region of a protective film's surface may refer to an area of the protective film's surface that, when the protective film is bonded to the surface of the construction panel, extends from an edge of the construction panel and across the surface of the protective film. In embodiments, the peripheral region may extend from the edge of the surface of the construction panel and across from about 0.1% to about 25% of the width of the surface. In some embodiments, the peripheral region may extend from the edge of the surface of the construction panel and across from about 0.2% to about 10%, from about 0.5% to about 2%, from about 1% to about 5%, from about 1% to about 10%, from about 1% to about 15%, from about 5% to about 10%, from about 5% to about 15%, from about 5% to about 20%, from about 5% to about 25%, from about 10% to about 15%, or from about 10% to about 20% of the width of the surface.

The peripheral region may also vary depending on various factors such as the materials used for the construction panels, the construction panel dimensions, the materials used for the protective films, the protective film dimensions, process parameters used to manufacture the construction panels (as described herein) and the type of adhesive composition used to bond the protective film to the construction panels.

As described herein, "adhesive composition" is any substance applied to a surface of one, or both, of two separate articles to bond them together to resist their separation. As it will be appreciated, the term "bond" or "bonding" refers to the fixing or securing of two separate surfaces together. This may include the formation of covalent bonds, ionic bonds, dipole-dipole bonding, hydrogen-bonding, Van der Waal forces or alike.

In embodiments, the adhesive composition is used to bond a protective film to a construction panel. A suitable adhesive composition may include, but is not limited to, a hot melt adhesive, drying adhesive, pressure sensitive adhesive, contact adhesives or any combination thereof. Where the adhesive composition is a hot melt adhesive, the composition may include waxes, resins, ethylene-vinyl acetate copolymers, polyolefins, polyamides, polyesters, polyurethanes, styrene block copolymers, polycaprolactones, polycarbonates, fluorinated polymers, silicone based polymers, polypyrroles or any combination thereof. Preferably, the adhesive composition is an ethylene-vinyl acetate copolymer based adhesive optionally wherein the viscocity of the ethylene-vinyl acetate copolymer based adhesive is from about 1000 to about 3100 cPs @ 160° C., from about 1000 to about 1500 cPs @ 170° C., from about 1500 to about 2500 cPs @ 150° C. or from about 1500 to about 2500 cPs @ 180° C.

Examples of the adhesive compositions used to bond a protective film to a construction panel including their respective suppliers, grades and viscosity measurements, are as illustrated in Table 1 below.

TABLE 1

Examples of adhesive compositions

| Supplier | Grade | Viscosity |
| --- | --- | --- |
| Abrabond ™ | AB464HM | 1700 cPs @ 160° C. |
| Adhesives direct ™ | AD826 | 1750 cPs @ 160° C. |
| Adhesives direct ™ | AD851 | 1900 cPs @ 160° C. |
| Alphabond Adhesives ™ | Fastlock 66x | 1850 cPs @ 160° C. |
| Alphabond Adhesives ™ | Fastlock 30029 | 1700 cPs @ 160° C. |
| Beardow Adams ™ | Prodas 2308 | 1795 cPs @ 160° C. |
| Beardow Adams ™ | Prodas 1507 | 1700 cPs @ 160° C. |
| Beardow Adams ™ | Prodas 2247 | 3080 cPs @ 160° C. |
| Bostik ™ | Thermogrip 9691 | 1300 cPs @ 170° C. |
| Caswell Adhesives ™ | Premiermelt 178PA | 1450 cPs @ 160° C. |
| Colquimica ™ | K-melt C2310 | 1000 cPs @ 160° C. |

TABLE 1-continued

Examples of adhesive compositions

| Supplier | Grade | Viscosity |
| --- | --- | --- |
| HB Fuller ™ | Swift-therm 9119 | 2200 cPs @ 150° C. |
| Jowat Adhesives ™ | Jowatherm 261.40 | 1800 cPs @ 180° C. |

As described herein, "protective film" is any sheet-like material which when applied and bonded to the surface of a construction panel provides a barrier to protect the surface of the construction panel from damage, for example, physical impact, water ingress or UV light exposure. The term "protective film" may be used interchangeably with the term "protective film layer" for the purposes of this invention. In some embodiments, the protective film may be a self-adhesive film and may include an adhesive composition pre-applied to its surface. Suitable protective films may include materials based on polyethylene, polypropylene, polyvinyl chloride, polyethylene terephthalate, polyvinylidene chloride, ethylene vinyl alcohol, ethylene vinyl acetate or any combination thereof. Such protective films may also be corona treated and/or UV stabilized prior to being used in the present method or panels. In some embodiments, the protective film may have a film weight of from about 60 grams per square metre to about 140 grams per square metre, from about 60 grams per square metre to about 80 grams per square metre, from about 60 grams per square metre to about 100 grams per square metre, from about 60 grams per square metre to about 120 grams per square metre, from about 80 grams per square metre to about 100 grams per square metre, from about 70 grams per square metre to about 100 grams per square metre or more preferably, from about 70 grams per square metre to about 90 grams per square metre.

Examples of the protective films applied to a surface of the construction panel including their respective suppliers, grades and description, are as illustrated in Table 2 below.

TABLE 2

Examples of protective films

| Supplier | Grade | Description |
| --- | --- | --- |
| Pavag Folien AG ™ | Rolamit Standardfolie | Cross laminated polyethylene polymers. UV stabilised and fully corona treated. Available range 60-120 grams per square metre. Typically 70-80 grams per square metre used. |
| Valeron ®Strength Films | Valcross | Cross laminated polyethylene polymers. UV stabilised and fully corona treated. Available range 60-120 grams per square metre. Typically 70-80 grams per square metre used. |
| Milspeed ™ | HDPE Film | Reprocessed high density polyethylene with ionomer resin, ethylene vinyl acetate and polyethylene terephthalate laminated with a polyester surface to provide good slip resistance. Available range 60-140 grams per square metre. Typically 80-90 grams per square metre used. |
| Don & Low ™ | Lobrene fabric | Coated industrial fabric coated one side with clear polypropylene and UV stabilised. Available range 60-120 grams per square metre. Typically 70-90 grams per square metre used. |

In some embodiments, there may be a further step of applying a further adhesive composition to the surface of the construction panel before applying the protective film to the construction panel. As it will be appreciated, the step of applying a further adhesive composition to the surface of the construction panel before applying the protective film to the construction panel may be performed when there is also step of selectively applying an adhesive composition to the peripheral region of a surface of the construction panel performed as part of the method. In other embodiments, the step of applying a further adhesive composition to the surface of the construction panel before applying the protective film to the construction panel may be performed when there is a step of selectively applying an adhesive composition to the peripheral region of a surface of the protective film performed as part of the method. Alternatively, the step of applying a further adhesive composition to the surface of the construction panel before applying the protective film to the construction panel may be performed when there is a step of selectively applying an adhesive composition to the peripheral region of a surface of the construction panel and a step of selectively applying an adhesive composition to the peripheral region of a surface of the protective film performed as part of the method. Suitable further adhesive compositions to be applied to the surface of the construction panel are as described above. The further adhesive composition may be the same or different to the adhesive composition which is used during the step of selectively applying an adhesive composition to the peripheral region of a surface of the construction panel and/or selectively applying an adhesive composition to the peripheral region of a surface of the protective film.

In other embodiments, the further adhesive composition may be applied to the entire surface of the construction panel (i.e., complete coverage) or a part thereof. Moreover, the step of applying a further adhesive composition to the surface of the construction panel before applying the protective film may be performed after the step of selectively applying an adhesive composition to the peripheral region of a surface of the construction panel. Alternatively, the step of applying a further adhesive composition to the surface of the construction panel before applying the protective film may be performed prior to the step of selectively applying an adhesive composition to the peripheral region of a surface of the construction panel. In a further embodiment, the step of applying a further adhesive composition to the surface of the construction panel before applying the protective film may be at the same time as the step of selectively applying an adhesive composition to the peripheral region of a surface of the construction panel (i.e., simultaneously).

In still further embodiments, the step of applying a further adhesive composition to the surface of the construction panel before applying the protective film may include applying the further adhesive composition at a coat weight of from about 30 to about 100 grams per square metre, from about 40 to about 90 grams per square metre, from about 50 to about 80 grams per square metre, from about 50 to about 60 grams per square metre or from about 40 to about 50 grams per square metre. Preferably, the further adhesive composition may have a coat weight of from about 30 to about 60 grams per square metre.

In yet still further embodiments, the step of applying a further adhesive composition to the surface of the construction panel may be performed at an elevated temperature. Suitable temperatures may depend on the type of adhesive composition(s) being used and may include, but are not limited to, a temperature of from about 50° C. to about 200° C., from about 50° C. to about 150° C., from about 100° C. to about 200° C., from about 120° C. to about 180° C., from about 40° C. to about 160° C. Typically, the temperature of the further adhesive composition may be from about 125° C. to about 175° C. or from about 80° C. to about 150° C. Preferably, the step of applying a further adhesive composition to the surface of the construction panel may be performed at a temperature of about 150° C.

It will be appreciated that the step of applying a further adhesive composition to the surface of the construction panel may be performed using application techniques including, but not limited to, brushing/trowelling, spraying, bead-jetting, nozzle dispensing, roller coating, curtain coating, solid application or any combination thereof. In some embodiments, the step of applying a further adhesive composition to the surface of the construction panel may be performed using a roller coating technique as described in more detail, with reference to FIG. 2, below.

Prior to applying a protective film to the surface of the construction panel to bond the protective film to the construction panel, there may be a step of applying an additional adhesive composition to the protective film. Suitable adhesive compositions to be applied to the protective film are as described above and may be the same or different to the adhesive composition which is used during the step of selectively applying an adhesive composition to the peripheral region of a surface of the construction panel and/or selectively applying an adhesive composition to the peripheral region of a surface of the protective film. Moreover, the additional adhesive composition to be applied to the protective film may also be the same or different to the adhesive composition which is used during the step of applying a further adhesive composition to the surface of the construction panel before applying the protective film to the construction panel.

In some instances, an adhesive composition may be applied to an entire surface of the protective film (i.e., complete coverage) or a part thereof. Moreover, the step of applying an adhesive composition to the surface of the protective film may include applying the adhesive composition at a coat weight of from about 5 to about 100 grams per square metre, from about 10 to about 90 grams per square metre, from about 20 to about 80 grams per square metre, from about 30 to about 70 grams per square metre, from about 20 to about 40 grams per square metre or from about 40 to about 60 grams per square metre. More preferably, the coat weight may be from about 30 to about 50 grams per square metre. Even more preferably, the step of applying an adhesive composition to the surface of the protective film may include applying the adhesive composition at a coat weight of about 30 grams per square metre, about 35 grams per square metre, about 40 grams per square metre, about 45 grams per square metre or about 50 grams per square metre.

In other embodiments, the step of applying an adhesive composition to the protective film may be performed at an elevated temperature. Suitable temperatures may depend on the type of adhesive composition(s) being used and may include, but are not limited to, a temperature of from about 80° C. to about 220° C., from about 150° C. to about 200° C., from about 180° C. to about 220° C. More preferably, the step of applying an adhesive composition to the protective film may be performed at a temperature of from about 170° C. to about 190° C. Even more preferably, the step of applying an adhesive composition to the protective film may be performed at a temperature of about 180° C.

It is envisaged that the step of applying a further adhesive composition to the protective film may be performed using application techniques including, but not limited to, brushing/trowelling, spraying, bead-jetting, nozzle dispensing, roller coating, curtain coating, solid application or any combination thereof. In one example, the step of applying a further adhesive composition to the protective film may be performed using a spraying technique. Such a technique may also include one or more heated spray head(s) for applying the adhesive composition to the protective film.

In the present method of manufacturing, the step of selectively applying an adhesive composition to a peripheral region of the surface of a construction panel and/or selectively applying an adhesive composition to the peripheral region of a surface of the protective film may include bead jetting the adhesive composition onto the peripheral region. This may involve jetting a continuous or intermittent line of adhesive composition onto the peripheral region using one or more jetting heads. In some embodiments, the bead jetting involves selectively applying the adhesive composition to the peripheral region at a coat weight of from about 5 to about 80 grams per square metre, from about 20 to about 60 grams per square metre, from about 30 to about 50 grams per square metre, from about 10 to about 15 grams per square metre or from about 20 to about 30 grams per square metre. More preferably, the bead jetting involves selectively applying the adhesive composition wherein the coat weight is from about 15 to about 25 grams per square metre. In other embodiments, the bead jetting may involve selectively applying the adhesive composition to the peripheral region at a temperature of from about 80° C. to about 220° C., from about 150° C. to about 200° C., from about 180° C. to about 220° C. More preferably, the bead jetting may involve selectively applying the adhesive composition to the peripheral region at a temperature of from about 170° C. to about 190° C. Even more preferably, the bead jetting may involve selectively applying the adhesive composition to the peripheral region at a temperature of about 180° C.

It will also be appreciated that the bead jetting may include applying beads of the adhesive composition of varying bead diameter size to the peripheral region of the surface of the construction panel and/or protective film. Suitable bead diameter sizes may include, but are not limited to, diameters of from about 1 mm to about 8 mm, more preferably of from about 2 mm to about 4 mm. Once the step of applying a protective film to the surface of the construction panel to bond the protective film to the construction panel is performed, the beads of the adhesive composition located between the surface of the construction panel and the protective film may be compressed between the construction panel's surface and the protective film. This compression of the adhesive composition beads may lead to spreading of the beads thus resulting in a spread bead diameter size of from about 15 mm to about 30 mm depending on the bead diameter size.

In an alternative embodiment, the step of selectively applying an adhesive composition to a peripheral region of the surface of a construction panel and/or selectively applying an adhesive composition to the peripheral region of a surface of the protective film may include spraying the adhesive composition onto the peripheral region. This may involve spraying a continuous or intermittent line of adhesive composition onto the peripheral region using one or more spray heads. The spray heads may be spiral spray heads. In some embodiments, the spraying involves selectively applying the adhesive composition to the peripheral region at a coat weight of from about 5 to about 80 grams per square metre, from about 20 to about 60 grams per square metre, from about 30 to about 50 grams per square metre, from about 10 to about 15 grams per square metre or from about 20 to about 30 grams per square metre. More preferably, the spraying involves selectively applying the adhesive composition wherein the coat weight is from about 15 to about 25 grams per square metre. In other embodiments, the spraying may involve selectively applying the adhesive composition to the peripheral region at a temperature of from about 80° C. to about 220° C., from about 150° C. to about 200° C., from about 180° C. to about 220° C. or more preferably from about 170° C. to about 190° C. Even more preferably, the spraying may involve selectively applying the adhesive composition to the peripheral region at a temperature of about 180° C.

It is envisaged that the step of selectively applying an adhesive composition to a peripheral region of the surface of the construction panel and/or selectively applying an adhesive composition to the peripheral region of a surface of the protective film may include one or more suitable application techniques. The particular application technique or combination of application techniques, used to selectively apply an adhesive composition to the peripheral region will vary depending on the type of construction panels, protective films and adhesive compositions used. For example, in one embodiment, the step of selectively applying an adhesive composition to a peripheral region of the surface of the construction panel may be performed using a combination of both a spraying and bead jetting techniques.

In some embodiments, the surface of a construction panel has an elevated temperature prior to the step of applying an adhesive composition. When referring to the step of applying an adhesive composition, in this instance, it will be appreciated that such a step may include the step of applying an adhesive composition to a peripheral region of a surface of a construction panel or any other step of applying an adhesive composition to the surface of a construction panel. Preferably, the surface of a construction panel has an elevated temperature prior to any adhesive composition being applied during the present method. This is especially useful in overcoming problems/issues associated with applying hot melt adhesives to the surface of the construction panel wherein the surface of the construction panel is at an ambient temperature. For example, increasing the temperature of the surface of the construction panel to which the adhesive is to be applied may prevent stringing of the adhesive composition during application. The degree of temperature elevation will depend on the type of construction panel and the adhesive being used. Suitable temperatures at which to elevate the surface of a construction panel prior to applying an adhesive composition may include a temperature of from about 5° C. to about 60° C., more preferably from about 40° C. to about 60° C. The construction panels may be heated using any suitable heating means, for example, radiant gas heaters.

In some embodiments, there may be a step of bonding the protective film to the peripheral region of the surface of the construction panel. The nature of the bonding step may vary depending on the type of construction panels, adhesive compositions and protective films being used. In some instances, the step of bonding the protective film to the peripheral region of the surface of the construction panel may include applying a pressure, applying heat, exposure to UV light, applying a chemical activator or applying any other suitable activating means. In some embodiments, bonding the protective film to the peripheral region of the surface of the construction panel may include applying a pressure of from about 20 kPa to about 800 kPa, from about 100 kPa to about 700 kPa, from about 200 kPa to about 700 kPa, from about 300 kPa to about 600 kPa, from about 350 kPa to about 550 kPa to the peripheral region or, more preferably, a pressure of from about 400 kPa to about 500 kPa. Even more preferably, bonding the protective film to the peripheral region of the surface of the construction panel may include applying a pressure of about 400 kPa, about 450 kPa or about 500 kPa. The pressure can be applied using any suitable pressure applying means, for example, press down rubber wheels or pressure plates.

In another aspect of the present invention there is provided, a construction panel comprising a protective film layer on a surface of the construction panel and a peripheral adhesive composition layer located between the surface of the construction panel and the protective film layer, wherein the peripheral adhesive composition layer extends from an edge of the construction panel and across from about 0.1% to about 25% of the width of the surface.

It will be appreciated that a peripheral adhesive composition layer may be formed of any adhesive composition, as described above, which has been selectively applied to the peripheral region of a surface of a construction panel and/or selectively applied to the peripheral region of a surface of the protective film as also described above. It is envisaged that the peripheral adhesive composition layer acts to sufficiently secure or bond the protective film layer to the surface of the construction panel such that the problem of lifting (e.g., peeling away) of the protective film at the edges and peripheral region of the construction panel's surface (as mentioned above) is overcome.

In some embodiments, there is a further adhesive composition layer located between the surface of the construction panel and the peripheral adhesive composition layer. The further adhesive composition layer may cover the entire surface of the construction panel (i.e., complete coverage) or a part thereof. A suitable further adhesive composition layer may be formed of any adhesive composition as described herein. Moreover, the further adhesive composition layer may be formed of the same adhesive composition as that of the peripheral adhesive composition layer or a different adhesive composition. Alternatively, the further adhesive composition layer may be located between the peripheral adhesive composition layer and the protective film layer. Further still, the further adhesive composition layer may cover the entire inner surface of the protective film layer (i.e., complete coverage) or part thereof.

As will be appreciated, the peripheral adhesive composition layer may extend from an edge, as described herein, of the construction panel and across from about 0.1% to about 25% of the width of the surface of the construction panel. In some embodiments, the peripheral region may extend across from about 0.2% to about 10%, from about 0.5% to about 2%, from about 1% to about 5%, from about 1% to about 10%, from about 1% to about 15%, from about 5% to about 10%, from about 5% to about 15%, from about 5% to about 20%, from about 5% to about 25%, from about 10% to about 15%, or from about 10% to about 20% of the width of the surface.

In a further aspect, there is provided a construction panel obtainable by a method of manufacturing as described herein.

BRIEF DESCRIPTION OF THE DRAWINGS

Some embodiments of the present invention are described more fully hereinafter with reference to the accompanying figures. In the figures, dimensions may be exaggerated for clarity of illustration.

In the following detailed description, only certain embodiments of the present invention have been shown and described, simply by way of illustration. As those skilled in the art would realise, the described embodiments may preferably be modified in various different ways, all without departing from the spirit or scope of the present invention. Accordingly, the drawings and description are to be regarded as illustrative in nature and not restrictive.

DETAILED DESCRIPTION

Figure 1:
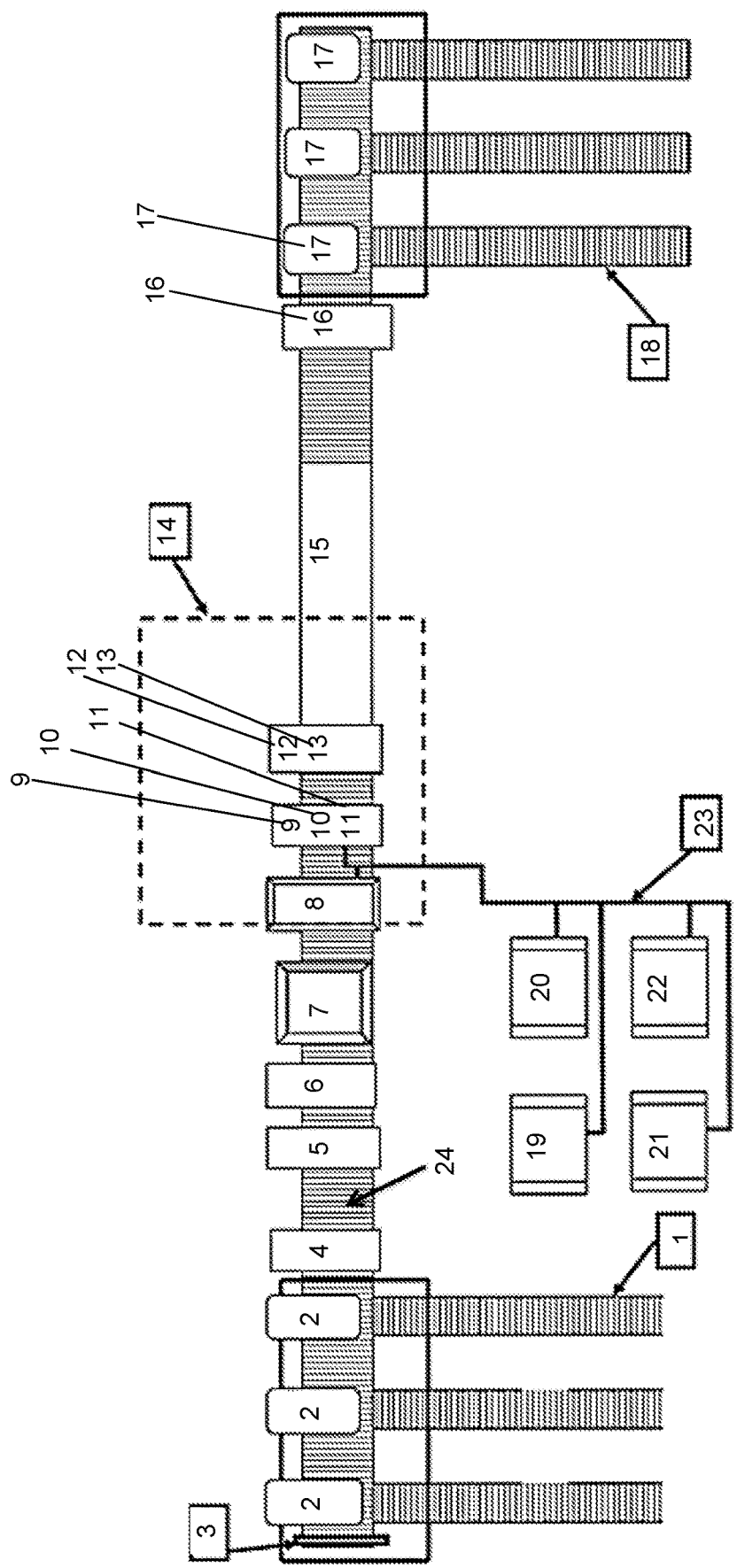
FIG. 1 illustrates an exemplary process flow diagram wherein a protective film is applied to the surface of a construction panel.

FIG. 1 illustrates an exemplary process flow diagram wherein a protective film is applied to the surface of a construction panel.

Construction panels (not shown) are delivered and loaded on to a feed conveyor system (1). Where the construction panels are delivered in packaging (e.g., bearers, slats, strapping, identification, or labels), before being removed, which is done manually. The panels are loaded, using a forklift truck or any other suitable means, onto the feed conveyer system (1) in either single stack or multiple stack arrangements. The feed conveyor system (1) transports the construction panels automatically towards an in-feed vacuum pick-and-place stacking system (2) which in turn transfers the construction panels onto a machine bed (24). Again, the construction panels are loaded on to the machine bed (24), automatically, in either single stack or as multiple stack arrangement.

An in-feed panel pusher (3) then conveys the construction panels along the machine bed (24) and into an in-feed nip roller (4). The construction panels are then conveyed through a brush roller (5) which cleans the surface of the panels. The brush roller (5) is also fitted with an extraction system to remove any dust on the panel surface. The dust is removed and taken away via an extraction pipe.

The construction panels are then automatically conveyed from the brush roller (5) into a governor roller (6). The governor roller (6) drives the construction panels along the remainder of the machine bed (24) and controls the line speed. The panels are automatically conveyed from the governor roller (6) into a gas radiant heater (7) where the surface of the construction panels is heated to approximately 45° C. From the gas radiant heater station (7), the construction panels are then fed into the heated roller coater (8), where an adhesive composition is applied to the top surface of the construction panels. The heater roller coater (8) is described in more detail below with reference to FIG. 2. Where the adhesive composition is a hot melt adhesive, heated hoses (23) are used to supply the heater roller coater (8) with the adhesive composition from an adhesive melting tank (19).

Figure 3:
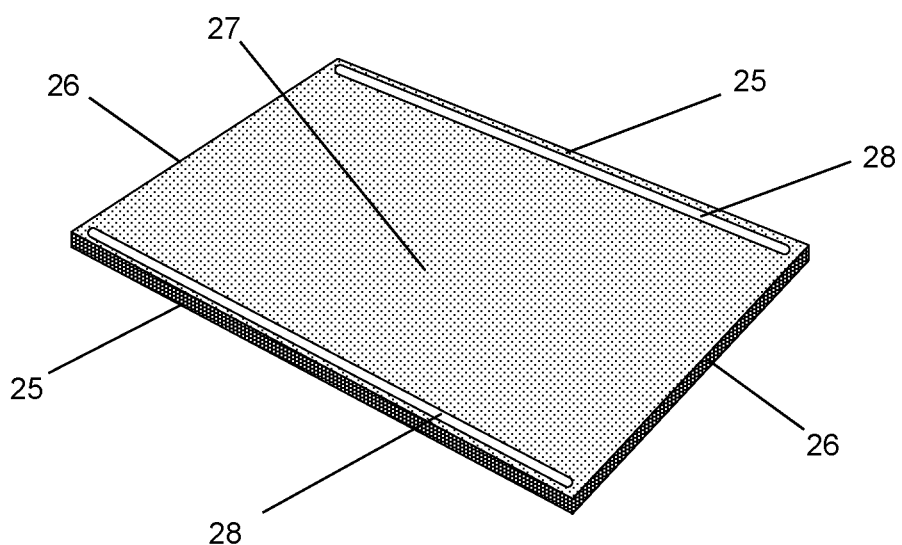
FIG. 3 illustrates an adhesive composition applied to the long edges of a construction panel.
Figure 4:
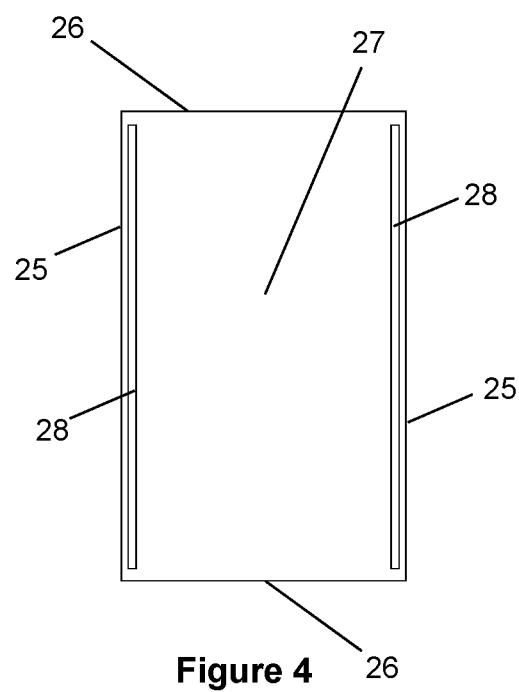
FIG. 4 provides a plan view of the construction panel illustrated in FIG. 3.
Figure 5:
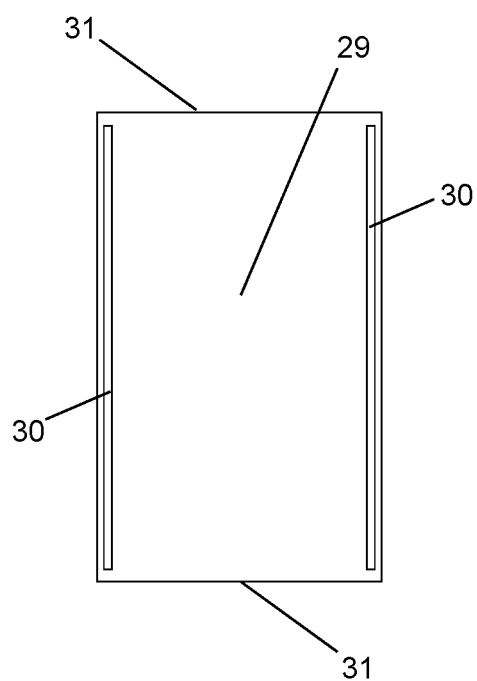
FIG. 5 provides a plan view of a protective film with adhesive composition selectively applied to its peripheral region.

The construction panels are then automatically conveyed from the heater roller coater (8) into a bead jetting head (9) and/or spiral spray head (10) where an adhesive bead is jetted and/or sprayed down along a peripheral region (28) (e.g., parallel to the long edges (25) as shown in FIGS. 3 and 4) of the construction panels. Where the adhesive composition is a hot melt adhesive, heated hoses (23) are used to supply the bead jetting head (9) and/or spiral spray head (10) with the adhesive composition from adhesive melting tanks (20) and (21).

The construction panels are then automatically conveyed from the bead jetting head (9) or spiral spray head (10) toward a spiral spray head (11) and a heated oil roller (12). The spiral spray head (11) applies an adhesive composition, from adhesive melting tank (22), onto a protective film that is then fed from a gantry and forced through a roller holder (14). The protective film is then fed around the heated oil roller (12) where the protective film is bonded to the surface of the construction panels under pressure.

The adhesive composition application steps (8), (9), (10) and (11) can be used independently or together depending on the requirements of the construction panel being processed and the types of adhesives used.

The film-bonded construction panels are then automatically conveyed from the heated oil roller (12) into a system of press down rubber wheels (13) where additional pressure is applied along the peripheral region (28) of the construction panels to compensate for any tolerances within the construction panels.

The construction panels are then automatically conveyed from the pressed down rubber wheels (13) to a cutting/inspection table (15) where any excess protective film (e.g., overhanging film) is cut along edges of the construction panels with a sharp instrument before the construction panels are quality checked.

The construction panels are then automatically conveyed from the cutting inspection table (15) to an outfeed nip roller (16) which directs the construction panels to an outfeed pick and place stacking system (17) where the panels are restacked on to outfeed conveyors (18) in either single stack or multiple stack arrangements.

The stacks are then then conveyed from the outfeed conveyor (18) to a packing station, preferably via a forklift truck, where the packs are repackaged into their original/alternative packaging.

Figure 2:
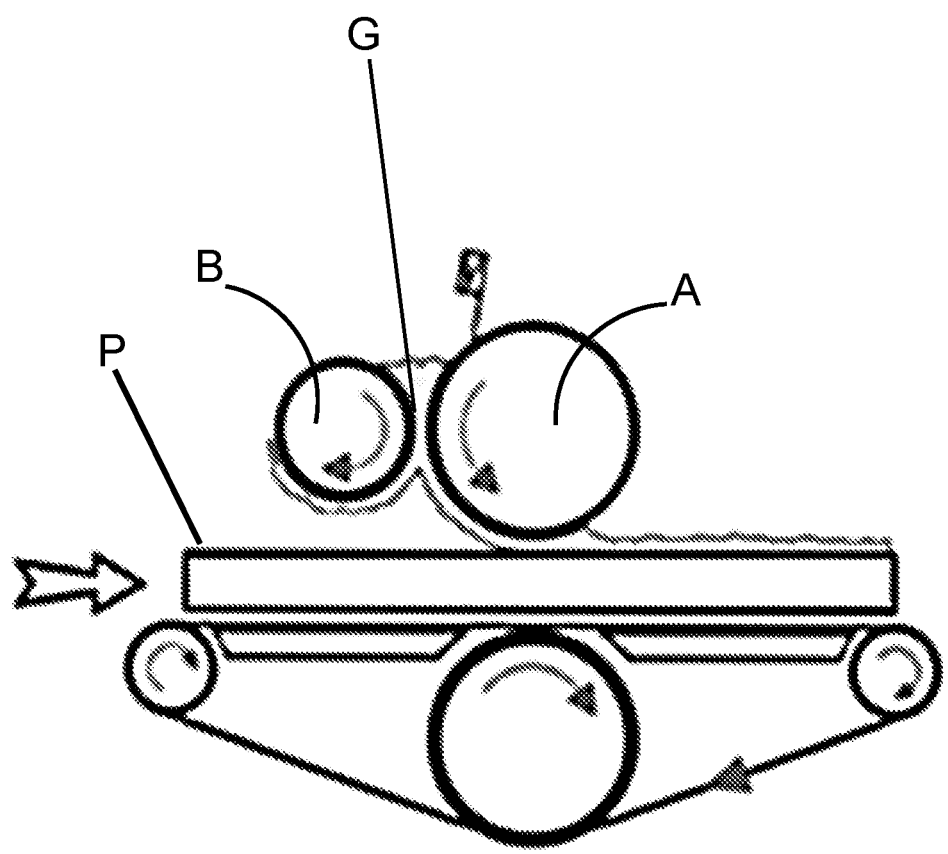
FIG. 2 illustrates a heater roller coater used to apply adhesive composition to the surface a construction panel.

FIG. 2 illustrates an example of the heater roller coater (8) as described above. The heater roller coater is made up of a silicon roller (A) and steel dosing roller (B) which are both oil heated via an electric element that goes through the centre of each of the rollers. Each roller may be independently heated at a temperature ranging from about 80° C. to about 150° C. depending on the type of adhesive being applied.

A gap (G) between the rollers (i.e., the distance between the silicon roller (A) and the steel dosing roller (B)) is adjusted to control the coat weight of the adhesive composition being applied to the surface of the construction panel. Typically gaps having measurements of from about 0 mm to about 3 mm are used but, generally, a heavy coat weight can be achieved by using a larger gap as compared to a lighter coat weight. Typical coat weights that can be achieved by the heater roller coater (8) range from about 30 grams to about 100 grams per square metre depending on the type of adhesive composition being used.

In use, an adhesive composition is pumped onto and into the space between the silicon roller (A) and the steel dosing roller (B). The adhesive composition is retained and prevented from spilling from the sides of the rollers by two pneumatic Teflon™ side plates (not shown) situated at each end of the rollers to create a well. The steel dosing roller (B) rotates in the opposite direction to the silicon roller (A) to force the adhesive composition between the rollers, down the well, through the gap (G) between the rollers and onto the surface of a panel (P) located beneath. As the machine bed, shown by (24) in FIG. 1, moves the panel (P) along the production line (in the direction of the arrow shown in FIG. 2) the adhesive composition is applied to the surface of the panel (P) via the silicon roller (A) at a coat weight corresponding to the gap (G) between the rollers.

It will be appreciated that the methods, materials and equipment/machinery described in relation to FIGS. 1 to 5 above, may be suitably modified by the skilled person to carry out a method wherein an adhesive composition is selectively applied to a peripheral region of a surface of the protective film before bonding the protective film to the surface of a construction panel.

What is claimed is:

1. A method of applying a protective film to a construction panel, the method comprising:
    (a) selectively applying a first adhesive composition to a peripheral region of a surface of the construction panel at a coat weight of from 15 to 25 grams per square metre;
    (b) applying the protective film to the surface of the construction panel and bonding the protective film to the peripheral region of the surface of the construction panel by applying a pressure of from 400 kPa to 500 kPa to the peripheral region;
    wherein:
        a second adhesive composition is applied to the entire surface of the construction panel at a coat weight of from 30 grams to 60 grams per square metre prior to the step of selectively applying the first adhesive composition to the peripheral region of a surface of the construction panel; and
        the peripheral region extends from a position inset from the edge of the construction panel by a distance of from 0.5% to 2.5% of the width of the surface of the construction panel and across from 0.5% to 2% of the width of the surface of the construction panel.

2. The method of claim 1, wherein the selectively applying the first adhesive composition to the peripheral region of a surface of the construction panel comprises bead jetting and/or spraying the first adhesive composition onto said peripheral region.

3. The method of claim 2, wherein the bead jetting comprises applying beads of a diameter size of from 1 mm to 8 mm.

4. The method of claim 1, further comprising selectively applying the first adhesive composition to said peripheral region at a temperature of from 80° C. to 220° C.

5. The method of claim 1, further comprising applying the second adhesive composition to the surface of the construction panel at a temperature of from 50° C. to 150° C.

6. The method of claim 1, further comprising applying a third adhesive composition to the protective film before applying the protective film to the construction panel.

7. The method of claim 6, further comprising applying the third adhesive composition to the protective film at a coat weight of from 5 grams to 100 grams per square metre.

8. The method of claim 6, further comprising applying the third adhesive composition to the protective film at a temperature of from 80° C. to 220° C.

9. The method of claim 1, wherein the surface of construction panel has a temperature of from 5° C. to 60° C. prior to selectively applying the first adhesive composition to said peripheral region.

10. The method of claim 1, wherein the first adhesive composition, second adhesive composition and/or third adhesive composition is a hot melt adhesive, drying adhesive, pressure sensitive adhesive, contact adhesives or any combination thereof.

11. The method of claim 10, wherein the first adhesive composition, second adhesive composition, and/or third adhesive composition comprises a hot melt adhesive.

12. The method of claim 11, wherein the hot melt adhesive comprises a component selected from the group consisting of waxes, resins, ethylene-vinyl acetate copolymers, polyolefins, polyamides, polyesters, polyurethanes, styrene block copolymers, polycaprolactones, polycarbonates, fluorinated polymers, silicone based polymers, polypyrroles or any combination thereof.

13. The method of claim 1, wherein the protective film comprises polyethylene, polypropylene, polyvinyl chloride, polyethylene terephthalate, polyvinylidene chloride, ethylene vinyl alcohol, ethylene vinyl acetate or any combination thereof.

14. The method of claim 1, wherein the protective film has undergone corona treatment and/or UV stabilization.

15. The method of claim 1, wherein the construction panel is formed of plywood or orientated strand board (OSB).

16. A construction panel obtained by the method of claim 1.

17. The method of claim 1, wherein the panel width is from 300 mm to 1400 mm; the panel length is from 1000 mm to 5000 mm; and the panel thickness is from 3 mm to 100 mm.

* * * * *